United States Patent [19]
Cutler

[11] 3,855,395
[45] *Dec. 17, 1974

[54] PRODUCTION OF SILICON NITRIDE FROM RICE HULLS

[75] Inventor: Ivan B. Cutler, Penn, England

[73] Assignee: University of Utah, Salt Lake City, Utah

[ * ] Notice: The portion of the term of this patent subsequent to Aug. 21, 1990, has been disclaimed.

[22] Filed: Sept. 6, 1972

[21] Appl. No.: 286,641

[52] U.S. Cl. ................................ 423/344, 23/301
[51] Int. Cl. ...................... C01b 21/06, B01j 17/00
[58] Field of Search .................................... 423/344

[56] References Cited
UNITED STATES PATENTS

| | | | |
|---|---|---|---|
| 1,327,737 | 1/1920 | Reid | 201/19 |
| 1,506,999 | 9/1924 | Reid | 423/442 X |
| 1,572,510 | 2/1926 | Atkinson | 201/25 |
| 3,334,974 | 8/1967 | Fletcher et al. | 423/344 X |
| 3,754,076 | 8/1973 | Cutler | 423/345 |

FOREIGN PATENTS OR APPLICATIONS

| | | | |
|---|---|---|---|
| 234,129 | 4/1911 | Germany | 423/344 |
| 68,098 | 11/1960 | India | |

OTHER PUBLICATIONS

Lanning, "Agricultural and Food Chemistry," Vol. 11, No. 5, Pages 435–437, (1963).

*Primary Examiner*—M. Weissman

[57] ABSTRACT

This invention relates to the production of silicon nitride from rice hulls wherein rice hulls are reacted with nitrogen at an elevated temperature either singly or in combination with a catalyst comprising iron. This invention was made in the course of research supported by a grant from the Department of Health, Education and Welfare; and the assignee of this patent hereby grants and conveys to the United States Government a royalty-free, nonexclusive and irrevocable license for governmental purposes for the term of the patent.

4 Claims, No Drawings

PRODUCTION OF SILICON NITRIDE FROM RICE HULLS

At the present time, rice hulls constitute one of the major waste products of the agriculture industry and present a considerable solid waste disposal problem. Burning as a means of disposal is less than desirable due to the airborne pollution that such burning causes. Returning the rice hull to the land is impractical since by the nature of the harvesting process rice hulls accumulate at central locations surrounding the mills where the rice kernel is separated from the hull. This separation process does not occur in the field as with most other food grains. Thus, this particular agricultural waste product is readily available in centralized locations throughout rice producing areas of the world.

The most unique characteristic of rice hulls is the considerable ash content, which varies from 14 to 23%, depending upon variety of the rice, climate, yearly fluctuations, and geographical location at which the rice was grown. This ash which is left over from the burning of the rice hull is comprised almost entirely of silica ($SiO_2$) which represents approximately 95% by weight of the ash. Silica constitutes one of the major health hazards when the rice hulls are burned both by reason of the silica becoming airborne and also due to its toxicity.

The silica in rice hulls is in an extremely finely divided state which renders the silica into a form which is very readily rendered airborne by a burning process. However, it is the same finely divided state which also renders the silica readily available as a reactant for the reaction between silicon and nitrogen to form silicon nitride.

It is, therefore, an object of this invention to provide a method of converting the natural silicon content of rice hulls into silicon nitride.

It is another object of this invention to turn a nuisance waste product of the agriculture industry into a useful raw material for the production of silicon nitride.

It is even still a further object of this invention to provide improvements in the production of silicon nitride from rice hulls.

These and other objects of this invention will become readily apparent from the following description of the invention as set forth hereinafter.

Silicon is absorbed by the rice plant in a soluble form from the soil through the roots of the rice plant. It is then transported to the stem and green structure of the rice plant where it is deposited particularly in the hull surrounding the rice grain. Analysis of the entire plant has shown that the highest percentage of silica is in the leaf sheath (hulls)—approximately 13%, and the lowest percentage is in the influorescence (flower)—approximately 3%. The silicon thus deposited is generally deposited in insoluble forms. The sap within the cells of the rice plant is not sufficiently alkaline to keep the silicon in the form of a soluble alkali-silicate, thus, the silicon must be in a form which is highly soluble or easily, readily dispersable in nearly neutral alkaline medium. Prior studies have shown that some of the silicon in the rice hulls may be combined with the polysaccharide portion of the rice hull.

It has been found through experimental results that iron generally either in the form of powdered ferric oxide ($Fe_2O_3$), or as metallic iron and in quantities less than 3% by weight, acts as a catalyst in accelerating the reaction to form silicon nitride. Quantities of iron in excess of 3% and even up to 25% proved to have little or no effect on the rate of reaction.

In one experimental procedure, samples were prepared by mixing a pre-determined quantity of rice hulls with a pre-determined quantity of powdered iron oxide. Sufficient water was added to the mixture to form a slurry in order to cause the finely divided iron oxide particles to uniformly disperse on the surface of the rice hulls. The mixture was then dried and placed in a refractory crucible. Air was excluded from the crucible by a tightly sealed lid and the crucible and contents were then fired in a furnace at approximately 1200° C for one hour in order to remove all volatiles from the rice hulls. This coking operation left a mixture comprised essentially of silica and carbon in the crucible. The crucible was then placed in another furnace having a temperature controlling means wherein the sample was subjected to the action of heat and nitrogen gas. The carbon monoxide partial pressure resulting from the formation of silicon nitride was controlled by adjusting the flow rate of nitrogen gas passed through the furnace.

It is well known that in a reaction which produces a substance such as carbon monoxide, the reaction can be caused to proceed more rapidly if the product of the reaction, carbon monoxide, is removed from the reaction zone as rapidly as it is produced. Therefore, lowering the partial pressure of the resulting carbon monoxide environment tends to cause the reaction for the production of silicon nitride to proceed much more rapidly. To create an environment of lowered carbon monoxide partial pressure, the reaction zone was flushed with a nitrogen gas. By this means an increased partial pressure of nitrogen was maintained in addition to decreasing the partial pressure of carbon monoxide product from the reaction. It was found that, as the partial pressure of carbon monoxide decreased on the order of about $10^{-2}$ to $10^{-3}$, the reaction proceeded very favorably. However, because of the economics of increasing the nitrogen gas flow through the reaction zone, it was calculated that the partial pressure of the nitrogen at approximately $10^{-2}$ was probably the most economical. Increasing the carbon monoxide pressure from the $10^{-3}$ to $10^{-2}$ atmospheres was found to increase the reaction time by approximately one-third, however, the amount of nitrogen needed for the reaction was reduced by an order of magnitude.

Temperatures within the range on the order of about 1100° C to about 1350° C produced silicon nitride. At temperatures above approximately 1400° C the reaction tended to produce more silicon carbide than silicon nitride.

Scanning electron microscope microphotographs of the silicon nitride produced by this process show that the silicon nitride tends to form in "whiskers" of silicon nitride crystals. Some of these silicon nitride whiskers grow from what proved (by means of X-ray analysis) to be particles of iron from the iron catalyst in the reactant mix.

The data taken from the average value of three or more runs at each setting has demonstrated that the formation of silicon nitride is a function of temperature and time at various atmospheric partial pressures of carbon monoxide. From the data gathered, it was shown that the reaction to form silicon nitride followed nearly a linear rate law.

A complete reaction of silica from the rice hulls to form silicon nitride may be represented as follows:

$$3SiO_2 + 6C + 2N_2 \rightarrow Si_3N_2 + 6CO$$

From the foregoing, it can be assumed that the above reaction is not controlled by a solid state diffusion process in that the kinetic data as indicated by the rates of reaction being nearly linear.

Some possible rate-controlling steps that involve a gaseous species and a surface, thereby resulting in a linear reaction rate are as follows:

1. dissociation of silica into SiO and oxygen;
2. reaction of the nitrogen with SiO to produce silicon nitride and oxygen;
3. absorption of nitrogen onto the iron catalyst surface;
4. desorption of oxygen from the catalyst surface;
5. reaction of SiO on the carbon surface to produce SiC;
6. reaction of nitrogen on the SiC surface to produce silicon nitride by subsequent reaction.

There may be other possible rate controlling steps; however, the above are the most probable.

If one closely examines steps 5 and 6, it may be concluded that they most probably would be controlled by diffusion. Since the observed reaction rates were quite linear it may be assumed that neither step 5 nor step 6 is rate controlling.

Although iron up to about 3% by weight was found to act as a catalyst, it was shown experimentally that silicon nitride can be formed with or without such a catalyst. This conclusion was reached because silicon nitride was found on the bare crucible walls and it was therefore concluded that the catalyst is not a critical constituent for the formation of silicon nitride.

The effect of carbon monoxide partial pressure on the reaction rate was determined at temperatures of 1200°, 1300° and 1350° C. It was found that the reaction rate for the formation of silicon nitride is essentially independent of the total gas flow rate and a function only of the partial pressure of the carbon monoxide formed by the reaction. It may be reasonably assumed that the nitrogen carrier gas adequately swept away any carbon monoxide which resulted from the reaction process. It should be noted that at all carbon monoxide pressures, the partial pressure of nitrogen was approximately 1 atmosphere and essentially constant. Since it has been demonstrated that a reduction in the partial pressure of carbon monoxide results in an acceleration of the reaction to produce silicon nitride, it is presumed that increasing the pressure of the nitrogen gas will also accelerate the reaction.

The catalytic effect of powdered iron was compared with that of $Fe_2O_3$ in order to see if the form of the iron catalyst influenced the reaction rate at all. It was found that there was very little difference between the two catalysts as to the rate of formation of silicon nitride.

As the temperature in the reaction zone is increased, the reaction rate increases until temperatures of approximately 1400° C are reached. Above 1400° C, silicon carbide is formed instead of silicon nitride, and as such, it is recommended that firing temperatures be held to no greater than 1350° C. Based upon standard kinetic data, the above experimental conditions would require two hours of reaction time in order to assure complete conversion of the rice hulls to silicon nitride.

In the presently preferred embodiment of the invention, rice hulls are ground or otherwise finely divided, intimately mixed with iron oxide (if a catalyst is desired) and placed in a conventional oven wherein they are subjected to a standard coking process. During this coking process, residual moisture and other volatiles are driven off from the rice hulls leaving substantially silica and carbon. The coked rice hulls are then pelletized using a standard, commercially available organic binder. Pelletizing reduced the amount of fly ash which otherwise would be caused if the coked rice hulls were charged directly into a furnace in their finely divided state. A change in furnace design could readily alleviate the problem of fly ash, however, in this particular instance, the equipment used was constructed from commercially available parts and funds were insufficient to allow a more thorough study and design of a furnace. The pelletized rice hulls are then introduced into a second conventional furnace having a means to control the gas flow therein. In this particular embodiment, the furnace comprises a vertical tube of a refractory material with the gas flame applied to the exterior thereof. Means are available at the top for introducing the pelletized, coked rice hulls into the furnace and the silicon nitride is extracted from the bottom thereof. Nitrogen gas is introduced into the bottom of the tube and serves not only as a reactant but also to evacuate or otherwise reduce the partial pressure of carbon monoxide as it is formed in the reaction zone within the furnace. From the foregoing, it should be readily apparent that standard technology is sufficient to practice the invention as taught herein.

Applicant's invention as disclosed herein does not relate to the material or equipment necessary to reduce this invention to practice but resides in the novel discovery that the finely divided silicon dispersed throughout the hull of the rice plant lends itself readily to the reaction for producing silicon nitride when reacted with nitrogen and at an elevated temperature.

I claim:

1. A method for producing silicon nitride from rice hulls, comprising the steps of:
   placing rice hulls within an enclosure having an oxygen free atmosphere;
   heating the rice hulls to a temperature within the range on the order of about 1100°C to 1350°C; and simultaneously
   exposing the heated rice hulls to gaseous nitrogen until the silicon in the rice hulls is changed to silicon nitride; and
   separating the silicon nitride.

2. A method for producing silicon nitride from rice hulls as defined in claim 1 wherein said rice hulls are subjected to a coking operation prior to reacting said silicon in rice hulls with said nitrogen gas, said coking operation comprising heating said rice hulls in an atmosphere wherein substantially all oxygen has been excluded and to a temperature less than about 1200°C.

3. A method for producing silicon nitride from rice hulls as defined in claim 1 wherein carbon monoxide gas produced as a result of reacting said nitrogen gas with said silicon in said heated rice hulls is purged from said enclosure to reduce the partial pressure of said carbon monoxide, said purging being accomplished by the introduction of excess quantities of nitrogen gas into said chamber and the exhaust therefrom of a mixture of carbon monoxide and nitrogen gas.

4. A method of producing silicon nitride from rice hulls as defined in claim 1 wherein said reaction between said silicon in said heated rice hulls and said nitrogen is catalyzed by the addition of iron to said rice hulls in amounts ranging up to 3 per cent, said iron being added in the form of finely divided metallic iron or an oxide of iron either singly or in combinations.

* * * * *